(12) United States Patent
Baker et al.

(10) Patent No.: US 9,690,315 B2
(45) Date of Patent: Jun. 27, 2017

(54) CONSTANT INPUT CURRENT FILTER FOR POWER SUPPLIES AND RELATED SYSTEM AND METHOD

(75) Inventors: Everett E. Baker, Fort Wayne, IN (US); Bashirul A. Polash, Fort Wayne, IN (US); Christopher D. Ballard, Fort Wayne, IN (US)

(73) Assignee: Raytheon Company, Waltham, MA (US)

( * ) Notice: Subject to any disclaimer, the term of this patent is extended or adjusted under 35 U.S.C. 154(b) by 1289 days.

(21) Appl. No.: 13/302,125

(22) Filed: Nov. 22, 2011

(65) Prior Publication Data
US 2013/0127437 A1    May 23, 2013

(51) Int. Cl.
| | | |
|---|---|---|
| G05F 3/04 | (2006.01) | |
| G05F 3/08 | (2006.01) | |
| G05F 3/18 | (2006.01) | |
| G05F 3/20 | (2006.01) | |
| H02M 3/155 | (2006.01) | |
| H02J 7/34 | (2006.01) | |

(52) U.S. Cl.
CPC ............ *G05F 3/18* (2013.01); *G05F 3/20* (2013.01); *H02J 7/345* (2013.01); *H02M 3/155* (2013.01)

(58) Field of Classification Search
CPC ..... G05F 3/18; G05F 3/20; G05F 1/66; G05F 1/452; G05F 1/462; G05F 1/468; H02M 3/155; H02M 2001/0045; H02J 7/345
USPC ............... 323/312, 286, 237, 266, 271, 273; 363/47
See application file for complete search history.

(56) References Cited

U.S. PATENT DOCUMENTS

| | | | | |
|---|---|---|---|---|
| 4,868,730 | A | | 9/1989 | Ward |
| 5,036,269 | A | * | 7/1991 | Murari et al. ................ 323/266 |
| 5,087,871 | A | | 2/1992 | Losel |
| 6,144,539 | A | * | 11/2000 | Konopka ........... H05B 41/2851 315/352 |

(Continued)

FOREIGN PATENT DOCUMENTS

| | | |
|---|---|---|
| EP | 1253704 A3 | 1/2004 |
| JP | H09-232975 | 9/1997 |
| JP | 2001-160748 | 6/2001 |
| JP | 2008-181451 | 8/2008 |
| WO | WO 2004/023637 A1 | 3/2004 |

OTHER PUBLICATIONS

Office Action dated Feb. 7, 2014 in connection with U.S. Appl. No. 13/406,309.

(Continued)

*Primary Examiner* — Fred E Finch, III
*Assistant Examiner* — Lorena Bruner

(57) ABSTRACT

A system includes a capacitor and a current source configured to draw a constant input current from a power source and to generate an output current. The current source includes an n-type field effect transistor that is biased to operate as a constant current source. The current source is configured to provide the output current to the capacitor and charge the capacitor during a first time period associated with operation of a load. The current source is also configured to provide the output current to the load and the capacitor is configured to provide an additional current to the load during a second time period associated with operation of the load. The load could represent an electronic device having a time-varying output power characteristic, such as a wireless radio.

21 Claims, 3 Drawing Sheets

(56) References Cited

U.S. PATENT DOCUMENTS

| | | | |
|---|---|---|---|
| 6,369,517 B2 | 4/2002 | Song et al. | |
| 6,525,574 B1* | 2/2003 | Herrera | G11C 27/02 |
| | | | 327/589 |
| 6,583,607 B1* | 6/2003 | Marty | G05F 1/563 |
| | | | 323/273 |
| 6,841,981 B2* | 1/2005 | Smith et al. | 323/312 |
| 7,102,359 B2 | 9/2006 | Allen et al. | |
| 7,265,527 B1 | 9/2007 | Haug | |
| 7,638,991 B1 | 12/2009 | Kobayashi | |
| 2003/0151875 A1 | 8/2003 | Nguyen et al. | |
| 2005/0189965 A1* | 9/2005 | Tihanyi | 327/108 |
| 2006/0006850 A1 | 1/2006 | Inoue et al. | |
| 2006/0172782 A1 | 8/2006 | Planning et al. | |
| 2007/0046255 A1 | 3/2007 | Kim | |
| 2007/0194750 A1 | 8/2007 | Eager et al. | |
| 2009/0218997 A1 | 9/2009 | Hey et al. | |
| 2011/0109159 A1 | 5/2011 | Davis et al. | |
| 2011/0193495 A1 | 8/2011 | Mishima et al. | |
| 2012/0007576 A1 | 1/2012 | Suntio et al. | |
| 2012/0249111 A1 | 10/2012 | Guo | |
| 2013/0221943 A1* | 8/2013 | Baker et al. | H02M 3/158 |
| | | | 323/312 |

OTHER PUBLICATIONS

Office Action dated Jan. 30, 2015 in connection with U.S. Appl. No. 13/406,309.
International Search Report dated Nov. 30, 2012 in connection with International Patent Application No. PCT/US2012/056387, 3 pages.
Written Opinion of International Search Authority dated Nov. 30, 2012 in connection with International Patent Application No. PCT/US2012/056387, 6 pages.
Office Action dated Aug. 27, 2014 in connection with U.S. Appl. No. 13/406,309.
"Requirements for the Control of Electromagnetic Interference Characteristics of Subsystems and Equipment", Department of Defense Interface Standard, Dec. 2007, See esp. pp. 24-35, 269 pages.
Extended European Search Report dated Nov. 9, 2015 in connection with European Application No. 12850825.6, 10 pages.
Japanese Office Action issued for JP 2014-542308 dated Aug. 2, 2016, 6 pgs.

* cited by examiner

CONSTANT INPUT CURRENT FILTER FOR POWER SUPPLIES AND RELATED SYSTEM AND METHOD

GOVERNMENT LICENSE RIGHTS

This invention was made with government support under Contract No. FA8726-08-C-0008 awarded by the U.S. Department of Defense. The government may have certain rights in the invention.

TECHNICAL FIELD

This disclosure is directed in general to power supplies. More specifically, this disclosure is directed to a constant input current filter for power supplies and related system and method.

BACKGROUND

Many electronic devices are subject to various rules or regulations regarding their operation and use. For example, new equipment designed to operate on military platforms often needs to comply with long-established specifications for controlling the ripple current that the equipment can draw from military power supplies. As a particular example, the MIL-STD-461 document issued by the U.S. Department of Defense defines the CE101 requirement for power leads operating in the 30 Hz to 10 kHz range on military aircraft and submarines.

Wireless radios under development today are intended to support more complex radio frequency (RF) waveforms than previous radios. In older radios, a suitable RF envelope was often achieved using frequency modulation (FM), which provides a continuous RF output and causes a radio's input current to be continuous and virtually ripple-free. Amplitude modulation (AM) often needed some filtering to achieve suitable ripple values. The filtering was relatively simple unless the modulation included frequency components below 100 Hz, so limiting the low-end bandwidth of a signal corrected the problem. However, with newer modulation techniques (such as Have Quick, Syncgars, WNW, LINK16, and MUOS), the RF envelope waveforms are typically varied but repetitive. Using conventional power conversion circuits, a radio's input current would have the same form as its RF power output, so the radio's input power leads would fail the CE101 requirement.

A conventional solution for limiting ripple current is to install an LC filter between a power supply and a wireless radio. However, at low frequencies, an inductor in the LC filter typically needs to be extremely large. A rule of thumb is that the filter needs to be at least twice as large and twice as heavy as the transmitter it is filtering, which negatively impacts the size and weight of the wireless radio.

SUMMARY

This disclosure provides a constant input current filter for power supplies and related system and method.

In a first embodiment, a system includes a capacitor (118) and a current source (116) configured to draw a constant input current from a power source (110) and to generate an output current. The current source includes an n-type field effect transistor (202) that is biased to operate as a constant current source. The current source is configured to provide the output current to the capacitor and charge the capacitor during a first time period associated with operation of a load. The current source is also configured to provide the output current to the load and the capacitor is configured to provide an additional current to the load during a second time period associated with operation of the load.

In a second embodiment, a method includes drawing (602) a constant input current from a power source (110) using a current source (116). The method also includes generating an output current using an n-type field effect transistor (202) in the current source that is biased to operate as a constant current source. The method further includes, during a first time period associated with operation of a load, charging (606) a capacitor using the output current. In addition, the method includes, during a second time period associated with operation of the load, providing (612) the output current to the load and discharging (610) the capacitor to provide an additional current to the load.

In a third embodiment, an apparatus includes a current source (116) configured to draw a constant input current from a power source (110) and to generate an output current. The current source includes an n-type field effect transistor (202) that is biased to operate as a constant current source. The current source is configured to provide the output current to a capacitor and charge the capacitor during a first time period associated with operation of a load. The current source is also configured to provide the output current to the load and the capacitor is configured to provide an additional current to the load during a second time period associated with operation of the load.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIG. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
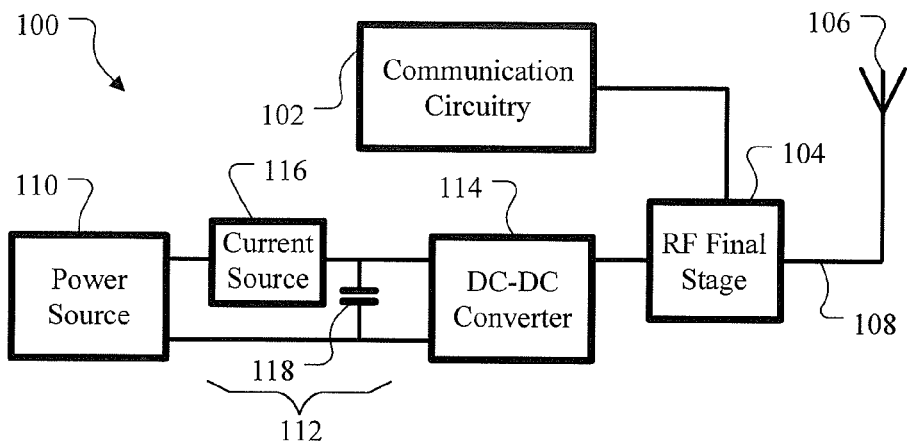
FIG. 1 illustrates an example system having a constant input current filter for a power supply in accordance with this disclosure.

FIG. 1 illustrates an example system 100 having a constant input current filter for a power supply in accordance with this disclosure. As shown in FIG. 1, the system 100 includes communication circuitry 102 coupled to a radio frequency (RF) final stage 104. The communication circuitry 102 generally represents components used to prepare signals for wireless transmission and/or to process signals received wirelessly. The communication circuitry 102 could include any suitable components to perform any suitable communications functions. For instance, the communication circuitry 102 could include a transmit path that uses filters, amplifiers, mixers, and other components to up-convert a baseband signal into an intermediate frequency or RF signal. The communication circuitry 102 could also include a receive path that uses filters, amplifiers, mixers, and other components to down-convert an intermediate frequency or RF signal into a baseband signal. The communication circuitry 102 could include any other or additional components according to particular needs.

The RF final stage 104 generally represents the components used to generate or prepare RF signals for transmission by an antenna 106 and/or to process RF signals received wirelessly by the antenna 106. For example, the RF final stage 104 could include a power amplifier for generating or amplifying RF signals for wireless transmission. The RF final stage 104 could include any other or additional components according to particular needs.

The antenna 106 represents any suitable structure for transmitting and/or receiving wireless signals, such as any suitable RF antenna. Note that while the use of RF signals is described here, the system 100 could include a wireless radio that communicates using any other suitable wireless signals. When other types of signals are used, appropriate components can be used in the communication circuitry 102 and the final stage 104 for handling those signal types.

The final stage 104 is coupled to the antenna 106 by a wired connection 108. The wired connection 108 represents any suitable connector that transports electrical signals to the antenna 106 for wireless transmission and/or from the antenna 106 during wireless reception. In some embodiments, the wired connection 108 represents a coaxial cable.

In this example, a power supply system provides power to the final stage 104 and typically other components, such as other components of the system 100 or other components within a larger device or system (like other components of a military aircraft or submarine). In this example, the power supply system includes a power source 110, a constant input current filter 112, and a DC-DC converter 114. The power source 110 represents any suitable source of operating power for the system 100, such as at least one battery, fuel cell, solar cell, or other power supply. In particular embodiments, the power source 110 represents a power supply on a military aircraft or submarine. The constant input current filter 112 represents a filter that helps to ensure that the current drawn from the power source 110 undergoes little if any ripple and therefore remains constant (at least for a given time period). The DC-DC converter 114 represents any suitable structure configured to convert energy from one direct current (DC) form to another. The DC-DC converter 114 could, for instance, represent a buck, boost, buck-boost, or other type of voltage converter.

Figure 2:
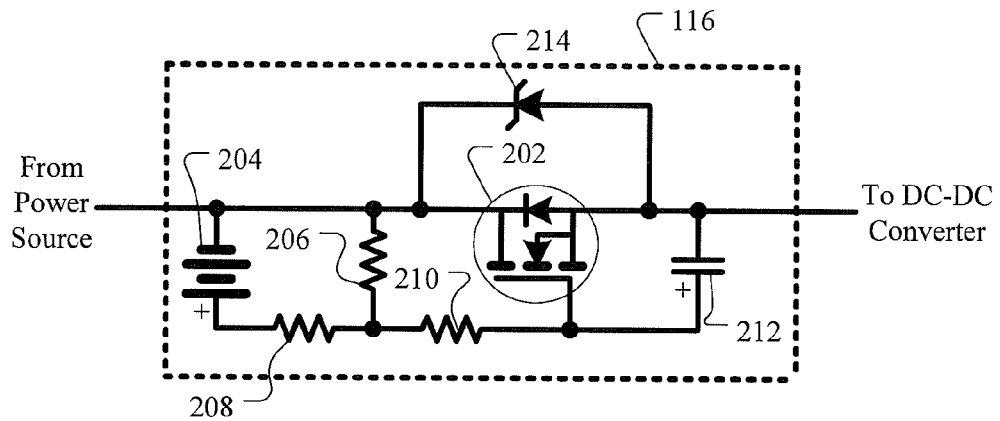
FIG. 2 illustrates an example current source in the constant input current filter of FIG. 1 in accordance with this disclosure.

As noted above, the constant input current filter 112 helps to ensure that ripple current drawn from the power source 110 by the final stage 104 is substantially reduced or eliminated, helping a wireless radio that includes the components 102-104 to satisfy requirements such as the CE101 requirements. In this example, the constant input current filter 112 includes a current source 116 and a capacitor 118. The current source 116 represents any suitable structure configured to generate an output current while drawing constant input current from the power source 110 for at least a given time period. In some embodiments, the current source 116 includes an n-type field effect transistor (NFET), which is configured to function as a current source. One example embodiment of the current source 116 is shown in FIG. 2, which is described below. The capacitor 118 represents any suitable capacitive structure having any suitable capacitance, such as a capacitor having a capacitance of about 60,000 µF. While the capacitor 118 may be quite large and take several seconds to charge up at system turn on if in-rush limit requirements (that are usually imposed) are followed, this can be acceptable, particularly when a wireless radio performs numerous digital processing operations at start up and the radio does not output any RF signals until control circuits are functioning properly.

During operation, the current source 116 provides a steady (constant) current. The current can be supplied to the DC-DC converter 114 or the capacitor 118. When wireless transmissions are not occurring and the final stage 104 requires little if any power, the current from the current source 116 is provided as a charging current to the capacitor 118. When wireless transmissions are occurring and the final stage 104 requires more power, the current from the current source 116 and additional current discharged from the capacitor 118 is supplied to the DC-DC converter 114 for use as an input current to the final stage 104.

As the wireless radio is operating, a varying transmit power can result in a varying input current to the final stage 104, which causes a varying output current from the DC-DC converter 114 and thus a varying input current to the DC-DC converter 114. The constant input current filter 112 helps to prevent this varying input current to the DC-DC converter 114 from appearing as a ripple current to the power source 110. Instead, it is the capacitor's discharging current that varies with the input current to the final stage 104. This results in a ripple voltage on the capacitor 118 but little if any ripple current on the power source 110.

In this way, a wireless radio having a time-varying output power characteristic can satisfy a requirement that it draw constant input current. The constant input current filter 112 can therefore be added in front of the wireless radio to effectively act as an electronic filter. This can enable, for example, a large number of wireless radios to more easily satisfy the CE101 requirements. Moreover, some devices may be required to comply with U.S. and NATO "TEMPEST" requirements. For some devices, it may be possible to glean secure information from a device by monitoring its input current. Use of the constant input current filter 112 along with a wireless radio or other device (particularly when integrated on a single integrated circuit chip) can help to ensure compliance with TEMPEST or similar requirements.

In particular embodiments, the final stage 104 could share a common ground with one end of a coaxial cable forming the wired connection 108, and that common ground could also function as a DC return for the DC-DC converter 114. The other end of the coaxial cable forming the wired connection 108 could be grounded at the chassis of a larger device or system, such as an aircraft chassis.

Although FIG. 1 illustrates one example of a system 100 having a constant input current filter 112 for a power supply, various changes may be made to FIG. 1. For example, as noted above, the system 100 could be used with a wireless radio or other device that transmits signals at any suitable frequency or frequencies and is not limited to use with RF devices. Also, the constant input current filter 112 need not be used with a wireless radio at all and could be used with any electronic device having a time-varying output power characteristic with a requirement for constant input current.

FIG. 2 illustrates an example current source 116 in the constant input current filter 112 of FIG. 1 in accordance with this disclosure. As shown in FIG. 2, the current source 116 includes an NFET 202 that operates as a controllable current source. The NFET 202 has a drain coupled to the power source 110 and a source coupled to the DC-DC converter 114. The drain of the NFET 202 is also coupled to a voltage source 204 and a resistor 206. A resistor 208 is coupled between the voltage source 204 and the resistor 206. A resistor 210 is coupled between a capacitor 212 and the resistors 206-208, and the capacitor 212 is coupled to the source of the NFET 202. A gate of the NFET 202 is coupled between the resistor 210 and the capacitor 212. A Zener diode 214 is coupled across the NFET 202.

The voltage source 204 represents any suitable source of a voltage, such as a 5V or other battery. Each of the resistors 206-210 includes any suitable resistive structure having any suitable resistance. The resistors 206-210 could, for example, have resistances of about 3 kΩ, 18 kΩ, and 10 kΩ, respectively. The capacitor 212 represents any suitable capacitive structure having any suitable capacitance, such as about 188 μF. The Zener diode 214 represents any suitable diode, such as an about 4V Zener diode.

Figure 3:
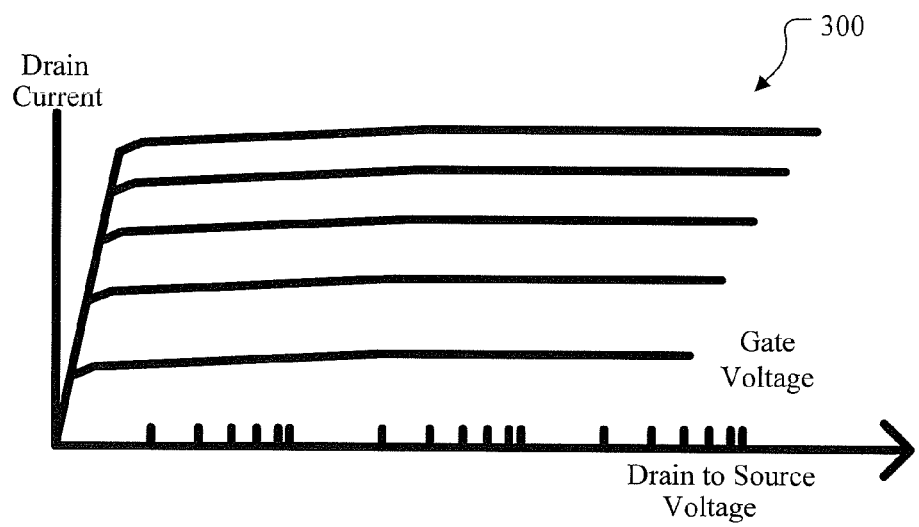
FIGS. 3 through 5B illustrate example operational characteristics of the system of FIG. 1 in accordance with this disclosure.

FIGS. 3 through 5B illustrate example operational characteristics of the system 100 of FIG. 1 in accordance with this disclosure. The current source 116 in FIG. 2 takes advantage of the fact that the NFET 202 is a device that inherently acts as a current source. FIG. 3 illustrates a graph 300 plotting example characteristics of a generic NFET 202. Note that for a given gate voltage, the drain current of the NFET 202 remains constant even when the drain-to-source voltage of the NFET 202 changes dramatically. If the correct gate voltage can be applied, the NFET 202 therefore operates as a current source. The resistor 206 can be adjusted for the particular NFET 202 selected for the current source 116 to help provide the correct gate voltage so that the NFET 202 operates as a current source. The resistor 206 operates to keep the NFET 202 barely biased on to operate as a constant current source, and once selected its value does not need to change.

If the required average current in the system 100 increases, the voltage across the NFET 202 increases. This causes the voltage on the capacitor 212 to increase, which in turn causes the gate voltage to increase and the NFET 202 to turn on harder. At that point, a new operating point has been reached. Operation can continue until a new average current is required. The Zener diode 214 limits the voltage across the NFET 202 and is capable of conducting the required current. This puts a specified voltage (such as about 4V) across the NFET 202, and the Zener diode 214 takes over as soon as the capacitor 212 gets charged to the correct voltage. In this way, the current source 116 operates in a self-regulating manner. In particular embodiments, acceptable operation can be achieved if changes are made at a rate that translates to less than 30 Hz, although other embodiments may support different rates.

Figure 4:
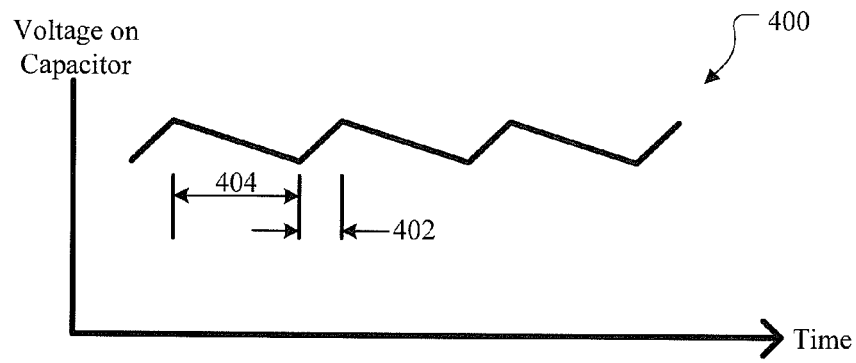

FIG. 4 illustrates a graph 400 plotting an example voltage on the capacitor 212 in the current source 116 of the constant input current filter 112 during operation of a wireless radio. In this example, the capacitor voltage repeatedly oscillates up and down during charging times 402 and discharging times 404, respectively. When the capacitor voltage is increasing during times 402, the final stage 104 is not transmitting, and current from the NFET 202 charges the capacitor 212. When the capacitor voltage is decreasing during times 404, the final stage 104 is transmitting, part of the current needed by the final stage 104 comes from the NFET 202, and the remainder of the current needed by the final stage 104 comes from the capacitor 212. Various charging times (time 402) and discharging times (time 404) are shown in Table 1, although these values are for illustration only.

TABLE 1

| High Current (Time on) | Low Current (Time off) |
| --- | --- |
| 7 ms | 2 ms |
| 1 s | 10 ms |
| 0.5 s | 10 ms |
| 0.25 s | 10 ms |
| 0.125 s | 10 ms |
| 400 μs | 100 μs |

During operation, the input current provided to the final stage 104 typically changes value. For example, as described above, the amount of current provided to the final stage 104 can vary depending on whether the final stage 104 is actively generating a signal for transmission. Also, the amount of current provided to the final stage 104 can vary depending on the transmit waveform and the required transmit output power. The current therefore repeatedly ramps up and down as the wireless radio is transmitting (keyed) and not transmitting (un-keyed). In particular embodiments, the capacitor 118 is relatively large to support the required transmit current when the current source 116 is ramping up, while the input current changes at a rate that is below a specified frequency. Note that the current source 116 may need time to achieve an optimal bias point after abrupt changes in the RF output waveform, so additional circuits and inputs could be used to "predict" the expected correct operating point in order to speed up performance.

Figure 5A:
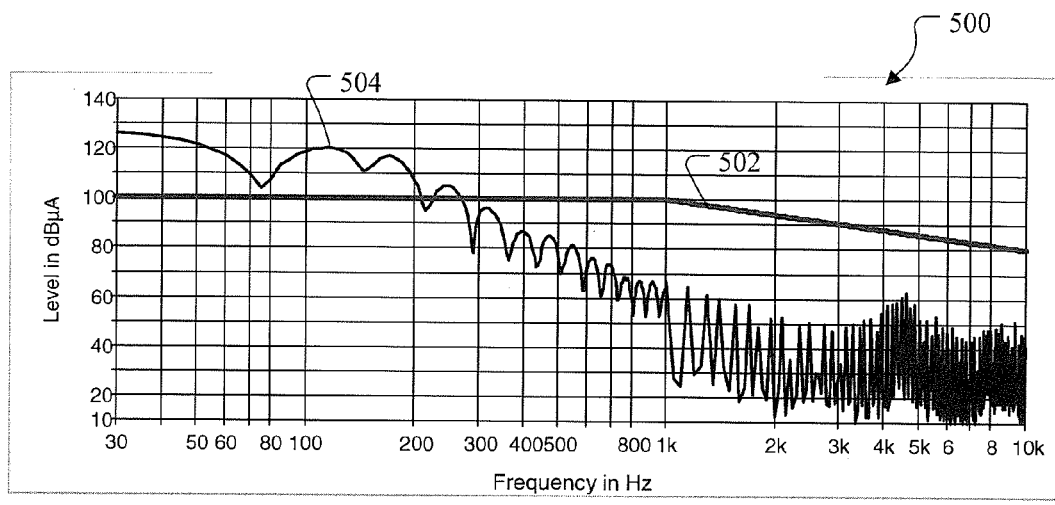
Figure 5B:
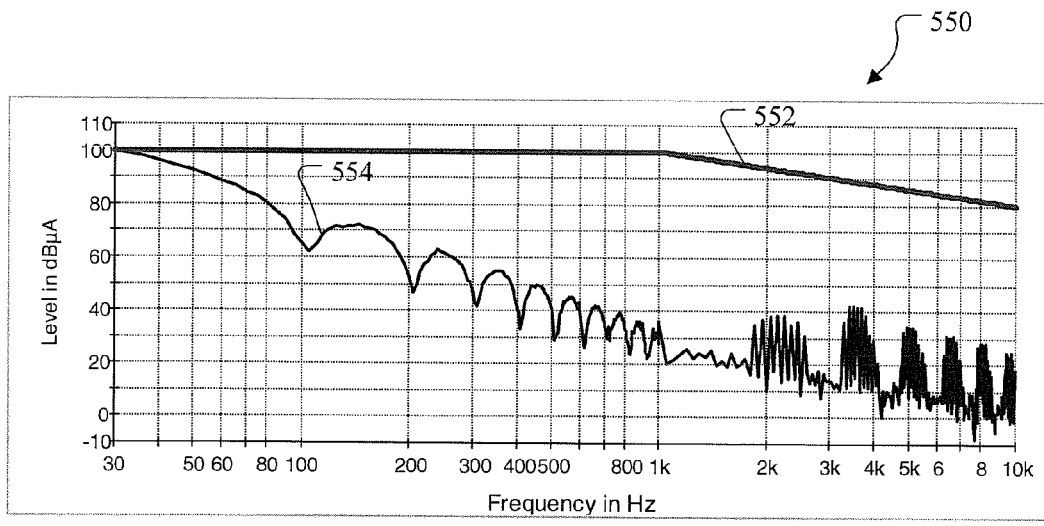

FIGS. 5A and 5B illustrate graphs 500, 550 showing example benefits of the system 100. As shown in FIG. 5A, a line 502 represents the allowable current ripple for devices operating at or below 28V pursuant to Figure CE101-4 of the CE101 specification. A line 504 represents the input current ripple for an RF wireless radio operating without the constant input current filter 112. As shown here, the RF wireless radio fails to comply with the CE101 requirements for most of the spectrum below about 270 Hz, at some points by as much as about 25 dB.

As shown in FIG. 5B, a line 552 represents the allowable current ripple for devices operating at or below 28V pursuant to Figure CE101-4 of the CE101 specification. A line 554 represents the input current ripple for an RF wireless radio operating with the constant input current filter 112. As shown here, the RF wireless radio complies with the CE101 requirements for the spectrum shown in FIG. 5B. The constant input current filter 112 can therefore resolve problems associated with CE101 compliance for any RF transmitter that needs to support modern waveforms while passing the CE101 requirements. The constant input current filter 112 can be scaled up to accommodate any size transmitter, such as by providing an NFET 202 having an appropriate size to handle the necessary current. The constant input current filter 112 is also applicable to AC-input transmitters, where an AC input is converted to a digital input by a digital-to-analog converter (and the constant input current filter 112 receives the digital signal). In addition, note that various switching techniques such as those used with linear regulators could be used to improve the efficiencies of the system 100.

Although FIG. 2 illustrates one example of the current source 116 in the constant input current filter 112 of FIG. 1, various changes may be made to FIG. 2. For example, other current sources that use an NFET as a controllable source could be used in the system 100. Although FIGS. 3 through 5B illustrate examples of operational characteristics of the system 100 of FIG. 1, various changes may be made to FIGS. 3 through 5B. For instance, these figures illustrate operational characteristics associated with specific implementations of the system 100, and systems implemented differently could have different operational characteristics.

Figure 6:
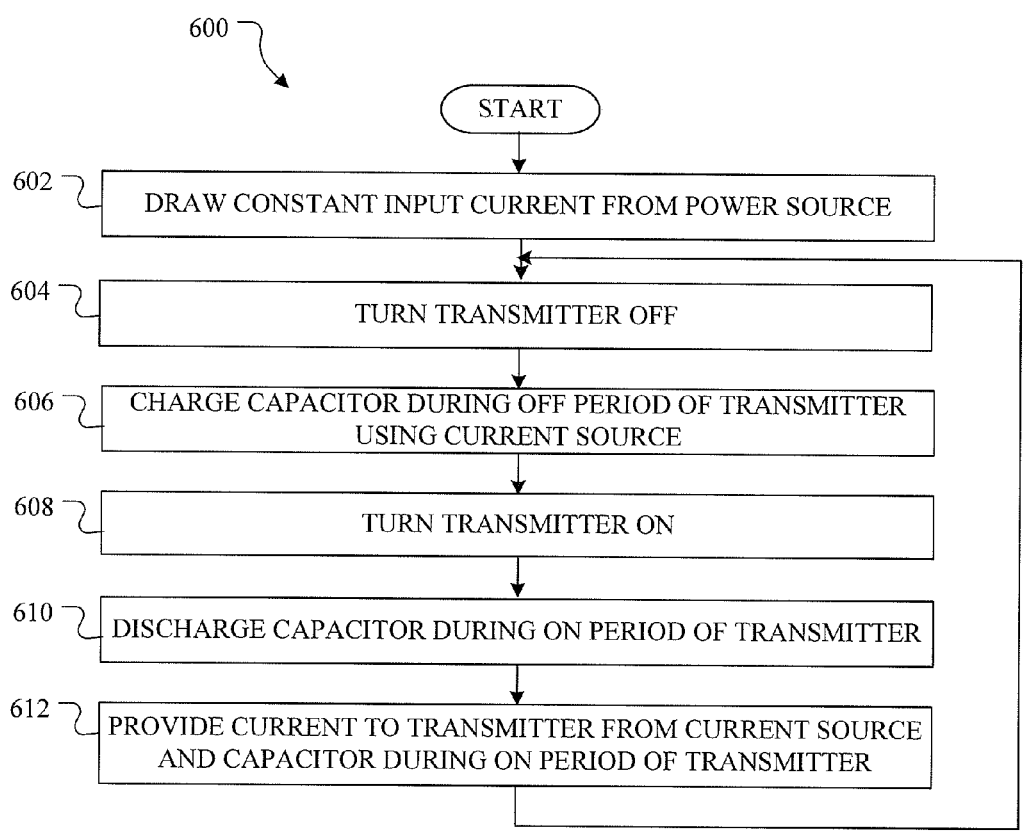
FIG. 6 illustrates an example method for providing a constant input current using a filter for a power supply in accordance with this disclosure.

FIG. 6 illustrates an example method 600 for providing a constant input current using a filter for a power supply in accordance with this disclosure. As shown in FIG. 6, a constant input current is drawn from a power source at step 602. This could include, for example, the current source 116 operating to ensure that a constant input current is drawn from the power source 110 in the system 100.

A transmitter is turned off at step 604, and a capacitor is charged during the off period of the transmitter using a current source at step 606. This could include, for example, turning off the final stage 104 in the system 100. This could also include using the current source 116 to charge the capacitor 118.

The transmitter is turned on at step 608, and a capacitor is discharged during the on period of the transmitter at step 610. This could include, for example, turning on the final stage 104 in the system 100. This could also include discharge the capacitor 118 to generate a discharge current. Current is provided to the transmitter by the current source and the capacitor during the on period of the transmitter at step 612. This could include, for example, providing current from the NFET 202 to the final stage 104 and providing the discharge current from the capacitor 118 to the final stage 104.

In this way, the transmitter receives the necessary input current during its on times from the NFET 202 and the capacitor 118, while the capacitor 118 is charged during off times of the transmitter. As a result, little if any ripple current appears at the power source 110 from the transmitter.

Although FIG. 6 illustrates one example of a method 600 for providing a constant input current using a filter for a power supply, various changes may be made to FIG. 6. For example, the same or similar method could be used for any load having a time-varying output power characteristic with a requirement for constant input current. Also, while shown as a series of steps, various steps in FIG. 6 could overlap, occur in parallel, occur in a different order, or occur any number of times.

It may be advantageous to set forth definitions of certain words and phrases used throughout this patent document. The term "couple" and its derivatives refer to any direct or indirect communication between two or more elements, whether or not those elements are in physical contact with one another. Terms such as "transmit," "receive," and "communicate," as well as their derivatives, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "constant" means at least substantially constant.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   a first capacitor; and
   a current source configured to draw a constant input current from a power source and to generate an output current, the current source comprising an n-type field effect transistor that is biased to operate as a constant current source;
   wherein the current source is configured to provide the output current to the first capacitor and charge the first capacitor during a first time period associated with operation of a load; and
   wherein the current source is configured to provide the output current to the load and the first capacitor is configured to provide an additional current to the load during a second time period associated with operation of the load.

2. The system of claim 1, wherein the current source further comprises:
   a voltage source coupled to a drain of the transistor;
   a first resistor coupled to the drain of the transistor;
   a second resistor coupled between the voltage source and the first resistor;
   a second capacitor coupled to a source of the transistor; and
   a third resistor coupled between the second capacitor and the first and second resistors.

3. The system of claim 1, wherein the current source further comprises:
   a Zener diode coupled across the transistor.

4. The system of claim 3, wherein the Zener diode is configured to conduct current around the transistor when the first capacitor is charged to a specified voltage level.

5. The system of claim 1, further comprising:
   a DC-DC converter coupled to the current source and the first capacitor, the DC-DC converter configured to be coupled to the load.

6. The system of claim 1, wherein the load comprises an electronic device having a time-varying output power characteristic.

7. The system of claim 1, wherein:
   the load comprises a wireless radio;
   the current source is configured to provide the output current to the first capacitor and charge the first capacitor during time periods when the wireless radio is not transmitting; and
   the current source is configured to provide the output current to the wireless radio and the first capacitor is configured to provide the additional current to the wireless radio during time periods when the wireless radio is transmitting.

8. A method comprising:
   drawing a constant input current from a power source using a current source;
   generating an output current using an n-type field effect transistor in the current source that is biased to operate as a constant current source;
   during a first time period associated with operation of a load, charging a first capacitor using the output current; and during a second time period associated with operation of the load, providing the output current to the load and discharging the first capacitor to provide an additional current to the load.

9. The method of claim 8, further comprising biasing the transistor using:
a voltage source coupled to a drain of the transistor;
a first resistor coupled to the drain of the transistor;
a second resistor coupled between the voltage source and the first resistor;
a second capacitor coupled to a source of the transistor; and
a third resistor coupled between the second capacitor and the first and second resistors.

10. The method of claim 8, further comprising:
conducting current around the transistor using a Zener diode when the first capacitor is charged to a specified voltage level.

11. The method of claim 8, further comprising:
providing the output current and the additional current to a DC-DC converter that is coupled to the load.

12. The method of claim 8, wherein the load comprises an electronic device having a time-varying output power characteristic.

13. The method of claim 8, wherein the load and the current source collectively comply with a CE101 power lead requirement defined in a MIL-STD-461 standard for power leads operating in a range of 30Hz to 10kHz.

14. The method of claim 8, wherein:
the load comprises a wireless radio;
the output current is provided to the first capacitor and charges the first capacitor during time periods when the wireless radio is not transmitting; and
the output current and the additional current are provided to the wireless radio during time periods when the wireless radio is transmitting.

15. An apparatus comprising:
a current source configured to draw a constant input current from a power source and to generate an output current, the current source comprising an n-type field effect transistor that is biased to operate as a constant current source;
wherein the current source is configured to provide the output current to a first capacitor and charge the first capacitor during a first time period associated with operation of a load; and
wherein the current source is configured to provide the output current to the load and the first capacitor is configured to provide an additional current to the load during a second time period associated with operation of the load.

16. The apparatus of claim 15, wherein the current source further comprises:
a voltage source coupled to a drain of the transistor;
a first resistor coupled to the drain of the transistor;
a second resistor coupled between the voltage source and the first resistor;
a second capacitor coupled to a source of the transistor; and
a third resistor coupled between the second capacitor and the first and second resistors.

17. The apparatus of claim 16, wherein a resistance of the first resistor is selected to properly bias the transistor.

18. The apparatus of claim 16, wherein the voltage source comprises a battery.

19. The apparatus of claim 15, wherein the current source further comprises:
a Zener diode coupled across the transistor.

20. The apparatus of claim 19, wherein the Zener diode is configured to conduct current around the transistor when the first capacitor is charged to a specified voltage level.

21. The system of claim 2, wherein a gate of the transistor is coupled between the second capacitor and the third resistor.

* * * * *